March 18, 1958

A. BLANCHARD 2,827,572

MEASURING APPARATUS

Filed July 9, 1954

*INVENTOR.*
ANDRE BLANCHARD
BY Robert Hockfield
HIS ATTORNEY

March 18, 1958 A. BLANCHARD 2,827,572
MEASURING APPARATUS
Filed July 9, 1954 3 Sheets-Sheet 2

INVENTOR.
ANDRE BLANCHARD
BY Robert Hockfield
HIS ATTORNEY

INVENTOR.
ANDRE BLANCHARD

United States Patent Office 2,827,572
Patented Mar. 18, 1958

2,827,572

MEASURING APPARATUS

André Blanchard, Houston, Tex., assignor, by mesne assignments, to Schlumberger Well Surveying Corporation, Houston, Tex., a corporation of Texas Application July 9, 1954, Serial No. 442,286

10 Claims. (Cl. 250—83.6)

This invention relates to measuring apparatus and, more particularly, pertains to a new and improved pulse-rate-measuring system.

Although useful in a variety of environments, a pulse-rate-measuring system embodying the present invention is ideally suited for use in well logging apparatus of the radioactivity type and for convenience will be described in that connection.

Heretofore, pulse-rate measurements in radioactivity logging apparatus have been made through the use of an integrator of the resistance-capacitance type. The integrator usually has a time constant selected to accommodate both the lowest and highest counting rates to be expected in logging the formations traversed by a borehole.

With a resistance-capacitance integrator of such a finite time constant, the system may operate satisfactorily at low logging speeds; i. e., where changes in counting rate occur very slowly. However, in order to minimize idle time in which drilling operations are interrupted, it is desirable to pass the logging instrument through the borehole quickly, and changes in counting rate from one earth formation to another may be rapid. Consequently, the integrator provides an indication dependent not only upon the formation immediately adjacent an instantaneous position of the logging instrument, but upon formations previously encountered. Obviously, the definition, or degree to which formations of different radioactivity characteristics can be depicted by the apparatus, may be seriously impaired at the desired logging speed.

It is an object of the present invention, therefore, to provide well logging apparatus incorporating an improved pulse-rate-measuring system that is not subject to the foregoing deficiency of prior equipment.

Another object of the present invention is to provide well logging apparatus including an improved pulse-rate-measuring system capable of accommodating rapid changes in the rate of occurrence of a succession of pulses.

Yet another object of the present invention is to provide an improved pulse-rate-measuring system suited for incorporation in radioactivity well logging equipment and which affords accurate indications of pulse-rate at normal logging speeds.

Still another object of the present invention is to provide an improved pulse-rate-measuring system for use in well logging apparatus and affording better definition between formations of different nuclear characteristics than heretofore possible.

A further object of the present invention is to provide an improved pulse-rate-measuring system for continuously depicting the rate of occurrence of a succession of pulses throughout an entire period of operation while maintaining a desired degree of absolute accuracy.

A pulse-rate-measuring system in accordance with the present invention is adapted to measure the rate of occurrence of a succession of impulses and comprises an accumulator to which an impulse is applied in a given sense in response to each of the succession of impulses. The apparatus further includes means for applying an impulse to the accumulator in a sense opposite to the aforesaid given sense at a time delayed from the application of each impulse of the given sense by a fixed time interval. Means are provided for indicating the instantaneous value of the sum derived by the accumulator, thereby to obtain a measurement of the rate of occurrence of the succession of impulses. In order to compensate for cumulative errors which may occur in the sum derived by the first-mentioned accumulator, a second accumulator is included in the apparatus and is supplied with an impulse in response to each of the succession of impulses occurring during one of repetitive checking intervals having a duration substantially equal to the aforesaid fixed time interval. Means are provided for adjusting the derived sum in the first-mentioned accumulator at the termination of each checking interval in response to the derived sum in the second accumulator.

The novel features of the present invention are set forth with particularity in the appended claims. The present invention, both as to its organization and manner of operation, together with further objects and advantages thereof, may best be understood by reference to the following description taken in connection with the accompanying drawings in which:

Figures 1, 2:
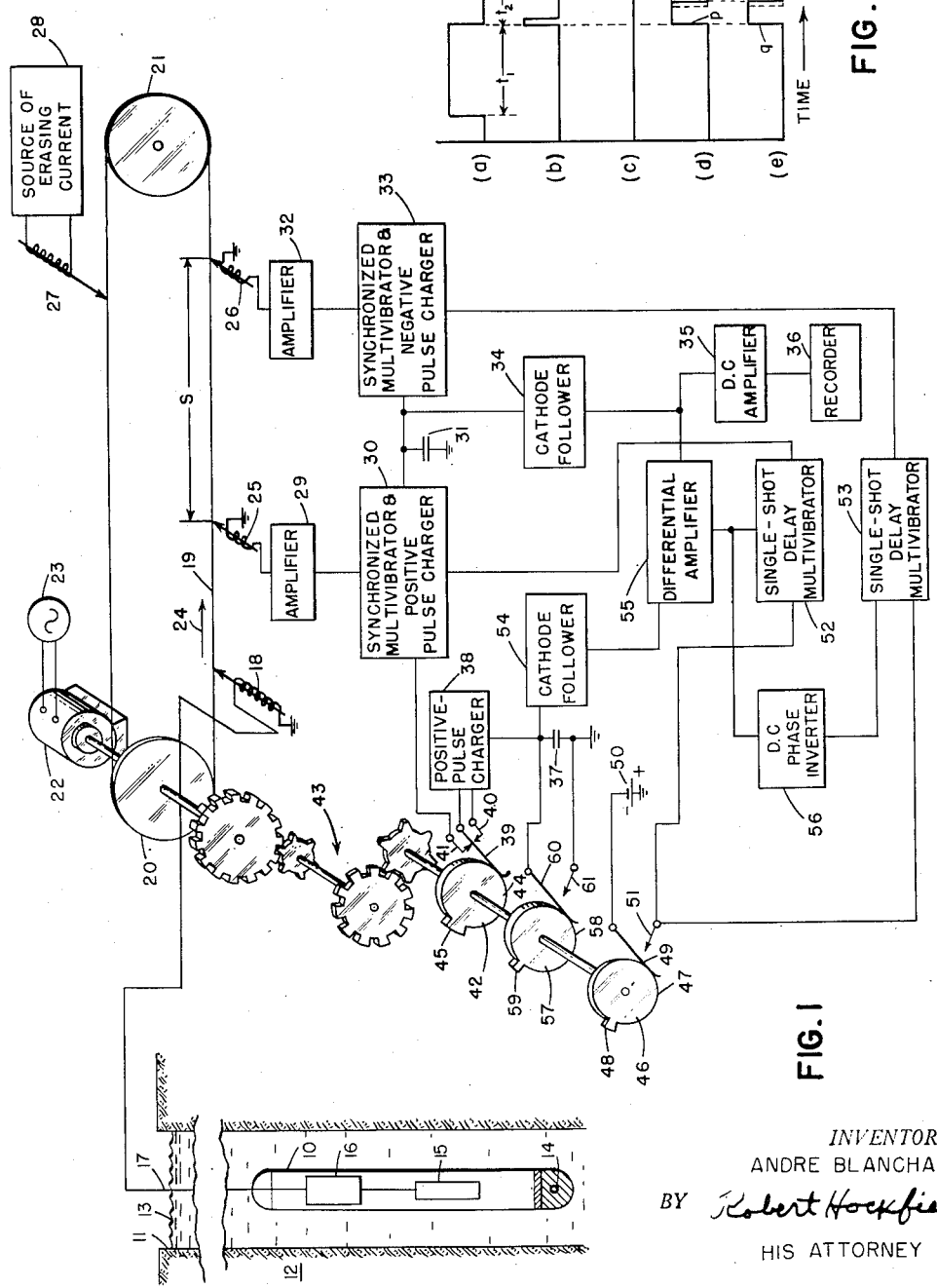
Fig. 1 is a schematic diagram, partly in block form, of well logging apparatus including a pulse-rate-measuring system constructed in accordance with the present invention.
Fig. 2 is a time diagram useful in explaining the operation of a portion of the apparatus of Fig. 1.

As shown in Fig. 1 of the drawings, the well logging apparatus including an improved pulse-rate-measuring system embodying the present invention, comprises a housing 10 adapted to be passed through a well or borehole 11 which traverses earth formations 12 and which may be filled with a drilling fluid 13, such as a water-base mud.

Supported within housing 10 is a source of radioactivity 14 which may, for example, be a radium-beryllium pellet for deriving neutrons to irradiate earth formations 12. These neutrons may be slowed within the formations to energies at which they may be captured and some of the resulting gamma radiation is returned to housing 10 where it may be intercepted by a detector 15, such as a Geiger tube. The output of detector 15 is in the form of a succession of pulses representing a nuclear characteristic of the earth formations and is supplied to an amplifier 16. The output of amplifier 16 is applied to a cable conductor 17 which extends through the borehole to the surface of the earth. The cable is suitably constructed so that it may be employed to support housing 10 within the borehole. Thus, it may be utilized in connection with a winch (not shown) for lowering and raising the housing in the borehole in the customary manner.

Although an instrument for irradiating the earth formations with neutrons and for detecting the resulting gamma radiation has been illustrated, obviously other types of instruments may be employed to derive a nuclear characteristic of earth formations 12. For example, a detector of naturally occurring gamma radiation, or apparatus of the neutron-neutron or gamma ray-gamma ray types, may be suitably incorporated within housing 10 to provide a succession of pulses at cable conductor 17, relative to ground, having a rate of occurrence indicative of a nuclear characteristic of the earth formations.

In the illustrated arrangement, the pulses on conductor 17 occur at a rate dependent upon the neutron-slowing-down and diffusion characteristics of the earth formations. For the most part, this is indicative of hydrogen content and thus the rate of occurrence of the succession of pulses represents the porosity of the formations. The apparatus of Fig. 1 further includes a pulse-rate-measuring system for deriving a record of this information as housing 10 traverses borehole 11.

To this end, the pulses on conductor 17 are supplied to a magnetic recording head 18 associated with a band or continuous tape 19 of magnetic recording material supported by a pair of pulleys 20 and 21. A driving motor 22 energized from a power source 23 is mechanically coupled to pulley 20 and drives magnetic tape 19 in the direction of arrow 24 at a velocity to be later defined.

A pair of magnetic pick-up heads 25 and 26 are spaced from recording head 18 in the direction of arrow 24 and are spaced from one another by a distance "s" which is related to the velocity of tape 19 in a manner to be described hereinafter. An erasing head 27 is associated with tape 19 and is positioned at a point spaced from pick-up head 26 in the direction of arrow 24. It is coupled to a suitable source of erasing current 28. If desired, other types of erasing mechanisms may be employed. For example, a conventional permanent magnet eraser may be suitably disposed relative to tape 19.

The output of pick-up head 25 is supplied to an amplifier 29, in turn, coupled to a synchronized multivibrator and positive pulse charger 30. As will be later described in connection with Fig. 3, unit 30 produces a pulse of fixed amplitude and duration in response to each pulse from detector 15 (supplied via amplifier 16, conductor 17, recording head 18, tape 19, pick-up 25 and amplifier 29). A charging condenser 31, or accumulator, included in the output circuit of unit 30 thus is supplied with impulses corresponding to the output pulses of detector 15 in a positive or given sense.

The output of pick-up head 26 is amplified in a stage 32 which is coupled to a synchronized multivibrator and negative pulse charger 33 also to be described in connection with Fig. 3. Unit 33 is coupled to accumulator 31 and supplies an impulse thereto in a sense opposite to the aforesaid given sense (with negative polarity) at a time delayed from the application of each pulse of given sense by a fixed time interval. This time interval is determined by the speed of tape 19 and the spacing "s" between pick-up heads 25 and 26 and is selected on the basis of the desired resolving power of the radioactivity well logging apparatus, taking into account the lowest counting rates normally experienced in logging. That is, the interval must be long enough so that the lowest expected counting rate may be recorded; however, the interval should be short enough so that at the usual speed with which instrument 10 traverses borehole 11, changes in counting rate are accurately depicted. For example, a time interval of 3 seconds is suitable at a logging speed of 4,000 feet per hour.

To obtain a log of the earth formations 12, means are provided for indicating the instantaneous value of the sum derived by accumulator-condenser 31. Accordingly, a cathode follower 34 supplied with the charge voltage on condenser 31 is connected to a directly coupled amplifier 35, in turn, connected to a recorder 36, such as a recording voltmeter. The recording medium in recorder 36 is displaced in proportion to movement of housing 10 through borehole 11.

It is significant to note that the positive pulses supplied to condenser 31 by unit 30 and the negative pulses supplied to this condenser by unit 33 should be of identical amplitude and duration, in an absolute sense, otherwise a cumulative error may occur in the sum derived by condenser 31. To compensate for such errors, the apparatus includes a second condenser-type accumulator 37 included in the output circuit of a positive pulse charger 38. The input circuit of unit 38 is connected to movable contact 39 and to fixed contact 40 of a single pole-double throw switch, having its other fixed contact 41 connected to stage 30. Contacts 39 and 41 are normally closed and thus a succession of impulses corresponding to the impulses derived by detector 15 is applied to condenser 37.

Movable contact 39 is associated with an actuating cam 42 driven by motor 22 through a gear train 43. Cam 42 is of generally disk-like configuration and includes a relatively long, annular edge portion 44 which, through the agency of gear system 43, passes switch arm 39 during a time interval substantially equal to the aforesaid fixed time interval. This interval may be defined as a checking interval and cam 42 is further provided with a raised section 45 for actuating switch arm 39 during a shorter interval which may be defined as a reset interval.

Also driven by gear system 43 is another cam 46 of generally disk-like configuration. It includes a relatively long, annular edge portion 47 and a small raised portion 48 positioned to actuate a movable arm 49 of a normally open switch at the termination of a checking interval. Arm 49 is connected to a battery 50 and is associated with a contact 51 connected to each of two single-shot delay multivibrators 52 and 53 of conventional construction.

The charge voltage on condenser 37 is applied via a cathode follower 54 to one input circuit of a differential amplifier 55 and the charge voltage on condenser 31 is applied via cathode follower 34 to the other input circuit of the differential amplifier. As will be described hereinafter in detail in connection with Fig. 4, amplifier 55 develops a control voltage having a magnitude and polarity dependent upon the difference between the compared voltages. This control voltage is applied directly to the delay-control circuit (not shown) of multivibrator 52, and to the corresponding circuit of multivibrator 53 via a directly coupled phase inverter 56. Thus, one of these multivibrators may be rendered inoperative while the duration of the pulse developed by the other is determined by the magnitude of the control voltage.

To reset the voltage on condenser 37 periodically, the apparatus includes a third cam 57 of disk-like configuration driven from gear train 43 and having an extensive edge portion 58 and a relatively short, raised portion 59. Portion 59 is arranged to actuate movable arm 60 at the termination of each reset interval. Contact arm 60 is associated with a fixed contact 61 and each of these contacts is connected to a respective terminal of condenser 37.

Although a single-line diagram has been illustrated in Fig. 1, it is to be understood that, where necessary, the circuits between the various components are completed by suitable ground connections.

In operation, as housing 10 traverses borehole 11, formations 12 are irradiated with neutrons and the resulting gamma radiation which intercepts detector 15 is indicative of a nuclear characteristic of the formations. The rate of occurrence of the succession of pulses supplied to amplifier 16 thus is dependent upon such a characteristic of the formations and, after amplification, these pulses are supplied over cable conductor 17 to recording head 18. Head 18, operating in a known manner, produces a change in magnetization on tape 19 as it travels in direction 24 so that a record is continuously made of the succession of pulses. As the tape passes pick-up head 25, the recorded variations produce a corresponding succession of pulses which are supplied to stage 29 where they are amplified and then supplied to synchronized multivibrator 30. Thus, in response to each in the succession of pulses, a positive increment of charge is applied to accumulator-condenser 31. Each of the recorded pulses on tape 19 that effects an increase in the charge on condenser 31 travels through distance "$s$" in the fixed time interval described hereinbefore and is detected or read by pickup head 26. Each detected pulse is amplified and applied to unit 33 which, in turn, supplies a corresponding impulse to accumulator 31 in a sense opposite to the sense supplied by unit 30. In other words, at the termination of a fixed time interval following a positive pulse, a negative pulse is applied to accumulator-condenser 31.

It is evident that the voltage on condenser 31 is, at any given time, proportional to the number of pulses that are intercepted by pick-up head 25 and which have not yet been intercepted by pick-up head 26. Of course, after the pulses on the tape pass pick-up head 26, they are erased by erasing head 27 and the process repeats continuously. It is further evident that the counting time is limited to a fixed time interval which is essentially always equal to the time a reference point on the tape takes to move from pick-up head 25 to pick-up head 26. Accordingly, all pulses within the interval are counted equally, whereas pulses outside of the interval are not counted at all. Thus, the resulting charge voltage on condenser 31 provides a running average of the rate of occurrence of the succession of pulses over the fixed time interval. This voltage is supplied via cathode follower 34 and amplifier 35 to recorder 36 and a continuous log of a nuclear radioactivity characteristic of the formations under investigation is obtained.

Since the derived charge voltage is based on accumulation, rather than time integration, not only may the entire range of expected counting rates be accommodated, but rapid changes in the rate of occurrence of the succession of pulses at relatively high logging speeds may be readily accommodated by the apparatus.

Moreover, inasmuch as pulses outside the fixed time interval do not contribute to the voltage on condenser 31, the past history of the nuclear characteristics of the formations encountered by housing 10 do not effect the voltage on condenser 31. Instead, the characteristics of the formations immediately adjacent the housing are responsible for this voltage. This feature, together with the ability to respond rapidly, makes it possible for logging apparatus embodying the present invention to provide better definition than heretofore possible. Accordingly, the deficiencies of prior art arrangements are avoided.

The operation of the remaining portion of the apparatus shown in Fig. 1 may be best understood by reference to the time diagram represented in Fig. 2. In this portion of the apparatus, cams 42, 57 and 46 are rotated continuously by motor 22 through gear train 43 at the selected speed described hereinbefore.

Let it be assumed that, in an initial portion of a cycle of operation, projection 45 of cam 42 has just passed from engagement with movable arm 39 and the arm 39 is in engagement with contact 41, and that this is the beginning of a time interval designated $t_1$ in Fig. 2a, wherein contacts 49 and 51 and contacts 60 and 61 are open. During this interval $t_1$, positive pulses representing the pulses derived by pick-up head 25 are supplied by positive pulse charger 38 to accumulator-condenser 37 and the voltage on this condenser builds up in accordance with the number of pulses applied thereto.

At the termination of checking interval $t_1$, raised portion 45 of cam 42 engages movable arm 39 to carry it from engagement with contact 41 into engagement with contact 40. Accordingly, pulses are no longer supplied to accumulator-condenser 37 and a reset interval $t_2$ is initiated. At the same time, raised portion 48 of cam 46 engages movable arm 49 and carries it into engagement with contact 51 thereby to derive a short pulse of voltage from battery 50, as represented by the pulse in Fig. 2b. This pulse occurs at the termination of checking cycle $t_1$ and its leading edge initiates one of the delay multivibrators 52 and 53 which provide pulses as illustrated in Figs. 2d and 2e, respectively.

Differential amplifier 55 continuously develops a control voltage representative of the difference between the charge voltages on condensers 31 and 37. Because of the presence of D. C. phase inverter 56, the control voltage is applied in opposite senses to the multivibrators 52 and 53.

If the output voltage of differential amplifier 55 is positive, the pulse developed by multivibrator 52 has a duration proportional to this voltage, as represented by the pulse "$p$" of Fig. 2d having a trailing edge of adjustable time-position.

If the output voltage of differential amplifier 55 is negative, a voltage of the same magnitude, but of opposite polarity with respect to a plane of reference potential or ground, is developed by phase inverter 56 and supplied to multivibrator 53. This multivibrator generates a pulse having a duration proportional to the applied voltage, as represented by pulse "$q$" of Fig. 2e.

It will be observed that only one of the multivibrators 52 and 53 is actuated when projection 48 of cam 46 engages movable arm 49 and carries it into engagement with contact 51; the polarity of the output voltage of differential amplifier 55 determines which of these multivibrators is actuated. Thus, when pulses "$p$" are generated, there are no pulses, such as "$q$," and conversely when pulses "$q$" are generated, there are no pulses, such as "$p$."

Since the pulses "$p$" from multivibrator 52 are applied to the positive pulse charger portion of unit 30 and pulses "$q$" from multivibrator 53 are applied to the negative pulse charger portion of unit 33, the charge on condenser 31 is increased or reduced, as the case may be, so as to correspond with the charge on condenser 37.

Just prior to the termination of a reset interval $t_2$ of a complete cycle of operation, projection 59 of cam 57 engages movable arm 60 and carries it into engagement with contact 61 thereby to short-circuit condenser 37 and bring the potential on this condenser to reference value of zero. This, of course, occurs after the termination of pulses developed by either multivibrator 52 or 53 and before the initiation of a checking interval $t_1$.

It is thus evident that means are provided for adjusting the voltage on condenser 31 at the termination of each checking interval in response to the voltage on condenser 37. In this way, cumulative errors in the potential on condenser 31 are continuously compensated and the voltage on this condenser provides an accurate indication of the rate of occurrence of the pulses under measurement. Accordingly, during the entire period of operation in which logging instrument 10 traverses the portion of borehole 11 to be logged, a desired degree of absolute accuracy in the pulse-rate measurements is maintained.

Figure 3:
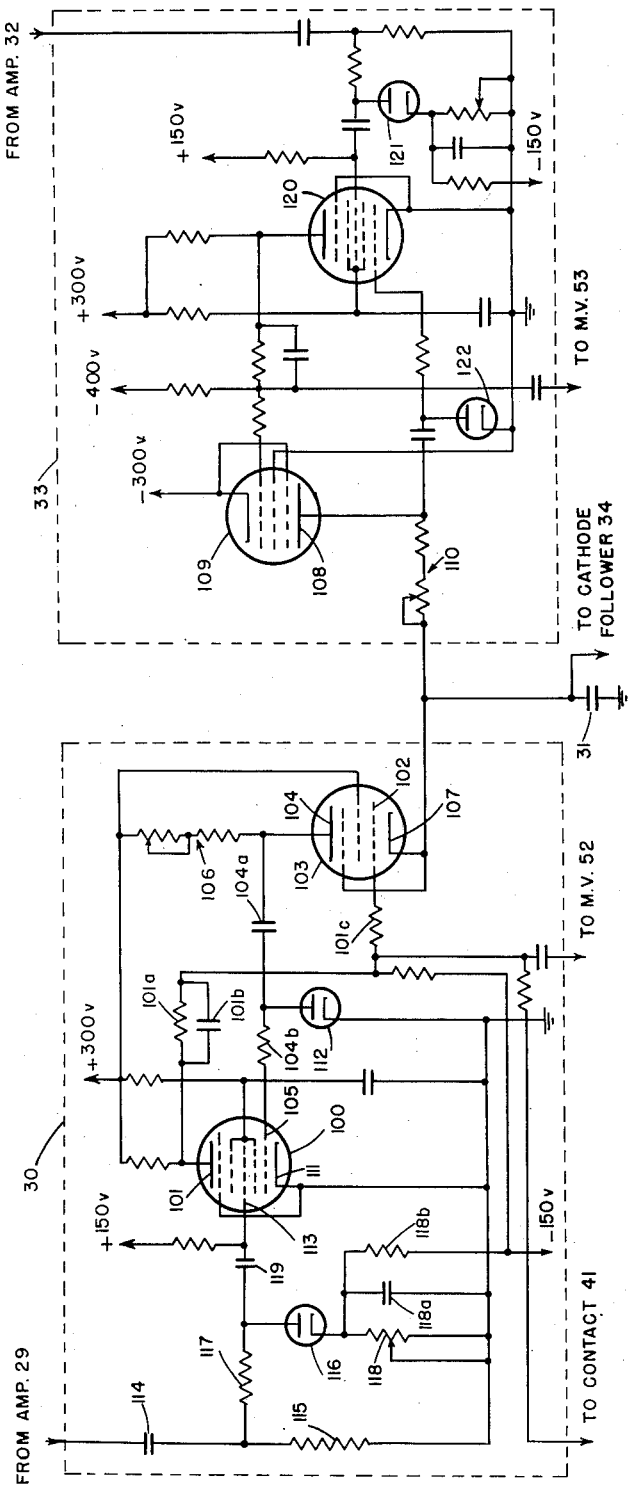
Figs. 3 and 4 are detailed circuit diagrams of portions of the apparatus shown in Fig. 1.

Fig. 3 illustrates certain circuit arrangements suitable for use as units 30 and 33 of Fig. 1. The multivibrator portion of unit 30 comprises an electron discharge device 100 of the pentagrid type having its anode 101 directly connected by a coupling resistor 101a in parallel with a coupling condenser 101b and a parasitic-oscillation-suppressing resistor 101c to control electrode 102 of a pentode-type electron discharge device 103. Anode 104 of pentode 103 is coupled by a series-connected condenser 104a and resistor 104b to control electrode 105 of device 100. The anode, screen and suppressor electrodes of pentode 103 are suitably energized from a source of positive potential (not shown). An adjustable anode load resistor 106 is provided for device 103 and its cathode 107 is connected to the ungrounded terminal of condenser 31. The cathode circuit for device 103 is completed by a connection to anode 108 of an electron discharge device 109 of the pentode type in unit 33. An adjustable resistor 110 for device 109 is included in its anode circuit and its cathode is energized from a source of negative potential (not shown).

Control electrode 105 and cathode 111 of device 100 are connected to the anode and cathode, respectively, of a clamping diode 112 arranged to become conductive in the presence of voltages of positive polarity with respect to cathode 111.

The anode, screen and suppressor electrodes of device 100 are suitably energized, and pulses from amplifier 29 are applied over a coupling circuit to its second control grid 113. This circuit comprises a coupling condenser 114 and a shunt resistor 115, in turn, shunted by a diode 116 having a resistor 117 in its anode circuit and a bias-adjusting resistor 118 in its cathode circuit. The cathode of diode 116 is maintained at an adjustable negative potential with respect to ground by means of rheostat 118 and a resistor 118a which extends to a source of negative potential. A by-pass condenser 118b is shunted across rheostat 118. Another coupling condenser 119 extends from the junction of diode 116 and resistor 117 to control grid 113.

In operation, at the beginning of an operating cycle, device 100 is highly conductive and device 103 is cut off. With the application of a negative triggering pulse from amplifier 29, the condition of conductivity of these devices is quickly reversed in a well-known manner, and the circuit remains in this reversed condition for an interval determined by the time constants of the circuit in a known fashion. At the termination of this interval, diode 112 comes into operation to limit the positive voltage applied to control grid 105 thereby preventing excessive grid current so that the output pulse developed by multivibrator 100—103 has a sharply defined trailing edge with substantially no overshoot. Since cathode 107 is connected to condenser 31, in response to each derived pulse a fixed amount of charge is supplied to the condenser. Accordingly, condenser 31 is charged in a positive direction in response to the pulses supplied by amplifier 29.

The coupling circuit, including condensers 114 and 119, resistors 115, 117 and 118 and diode 116, provides a very sharply defined negative trigger pulse essentially free of positive overshoot in response to each pulse from amplifier 29. By adjusting rheostat 118 so that diode 116 is conductive in the absence of a negative triggering pulse at its anode of sufficient amplitude to overcome the initial negative bias at its cathode, spurious triggering of multivibrator 100—103 by noise is minimized. Since the triggering pulse is fed to the second control grid 113 which is effectively shielded from other electrodes of device 100, the amplitude and shape of the pulses developed by multivibrator 100—103 are substantially independent of the amplitude and shape of the trigger pulses as long as the triggering pulse has a duration shorter than the pulse developed by multivibrator 100—103.

Circuit 33 is similar to circuit 30 and comprises a pentagrid type electron discharge device 120 which, together with pentode 109 is included in a multivibrator. The circuit further comprises an input diode 121 and a clamping diode 122.

It will be observed that while pentode 103 operates as a positive pulse charger with respect to condenser 31, pentode 109 is connected in an opposite polarity sense with respect to the condenser. Accordingly, in response to each pulse from amplifier 32, the pulse derived by the multivibrator 109, 120 causes a negative pulse to be applied to the condenser. Thus, pentode 109 operates as a negative pulse charger.

It is desirable that the time constants of the two charging circuits (including pentodes 100 and 109) be arranged so that the amplitudes of the charging currents do not vary appreciably during the charging time for condenser 31.

In order to equalize the relative absolute charges supplied to condenser 31 by units 30 and 33, resistors 106 and 110 are suitably adjusted. Accordingly, the unit charges received by condenser 31 from charging devices 103 and 109 may be approximately equal in value, but of opposite polarity.

It will be observed that the leads from multivibrators 52 and 53 are capacitively coupled to the grid circuits of pentodes 103 and 109, respectively. Thus, positive pulses produced by these multivibrators alter the accumulated charge on condenser 31 in the manner described hereinbefore in connection with Fig. 1.

It will further be observed that a lead extends from the anode circuit of device 100 to contact 41. Thus, in response to each pulse derived by multivibrator 100—103, a positive pulse is supplied via contacts 41 and 39 (Fig. 1) to positive pulse charger 38.

Figure 4:
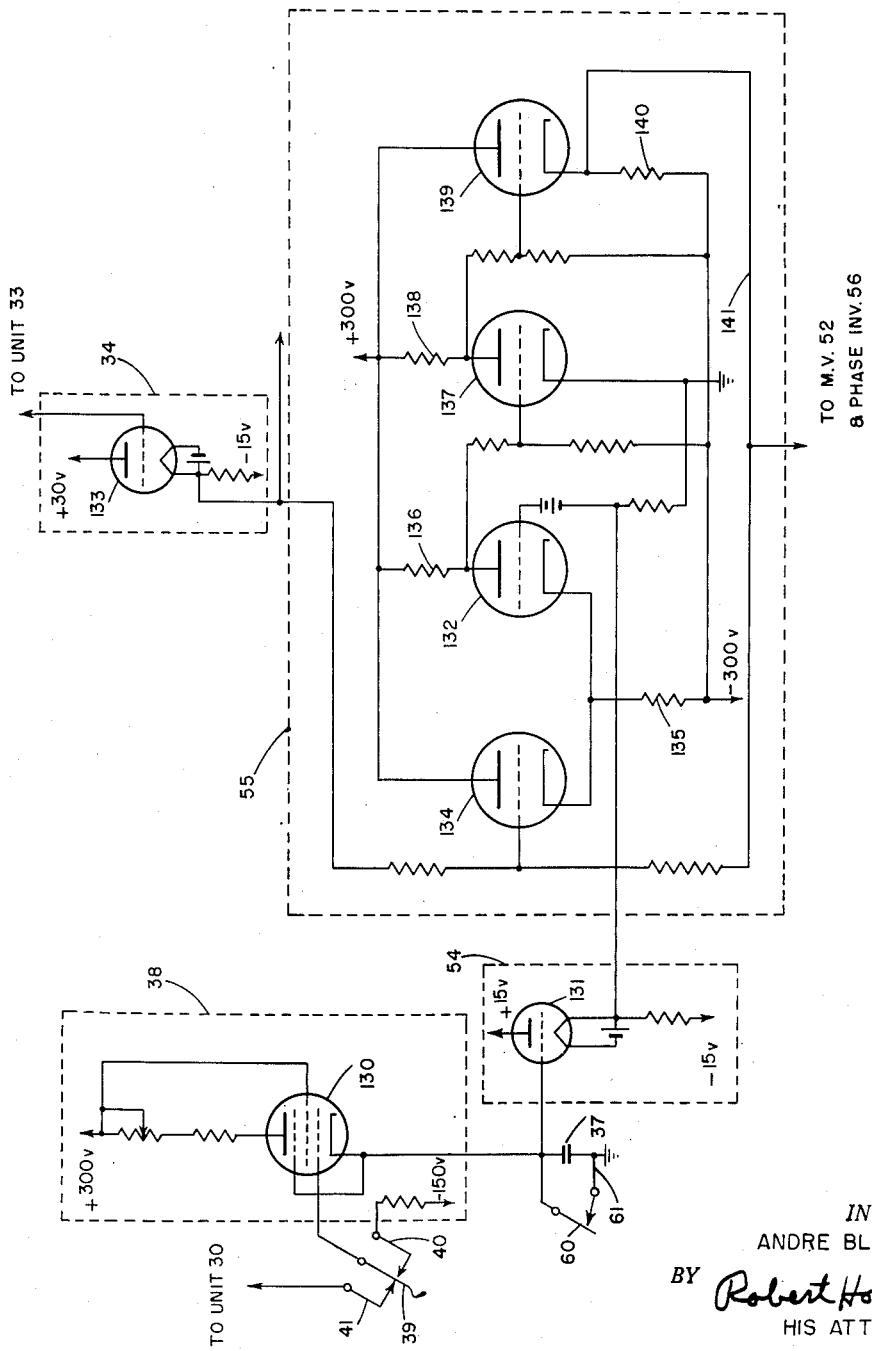

As shown in detail in Fig. 4, positive pulse charger 38 comprises a pentode-type electron discharge device 130 having its control electrode connected to movable switch arm 39. Its anode and screen electrodes are suitably energized and its cathode is connected to the ungrounded terminal of condenser 37. Thus, in response to each positive pulse supplied by unit 30, a pulse of current of predetermined duration flows through device 130 and applies to condenser 37 an elementary positive charge. The accumulated voltage on condenser 37 is supplied to the control grid of an electron discharge device 131 connected as a cathode follower. Device 131 preferably is an electrometer tube having an extremely high input impedance so that condenser 37 may not be discharged appreciably by grid current effects.

The output connection of cathode follower 54 terminates at the control grid of a triode-type electron discharge device 132 of differential amplifier 55. A similar form of electrometer tube 133 is included in cathode follower 34 and the output connection of this cathode follower is terminated at the control grid of another triode 134 of the differential amplifier. The anode of device 134 is connected to a source of positive potential (not shown) and its cathode and the cathode of device 132 are connected to a common cathode impedance 135. Thus, device 134 operates as a cathode follower which is cathode coupled to the input circuit of device 132.

Triode 132 is provided with an anode load resistor 136, connected to the grid circuit of a directly coupled amplifier, including a triode 137 having its anode load 138 directly connected to a triode 139. The anode of device 139 is connected to the source of positive potential and it is provided with a cathode load resistor 140 connected to a source of negative potential (not shown). Device 139 thus operates as a cathode follower and its cathode is connected by a lead 141 to the control grid of device 134 thereby to provide degenerative feedback. In addition, lead 141 extends to multivibrator 54 and to phase inverter 56.

In operation, the voltages supplied by cathode followers 54 and 34 control the anode-cathode current of triode 132 in opposite senses and by thus comparing these voltages, a potential representing the difference between them appears at anode load 136. After amplification in D. C. amplifier 137, this potential is supplied to cathode follower 139. Since the anode circuit of cathode follower 139 is energized from a source of positive potential and its cathode circuit is connected to a source of negative potential, the resulting control voltage on lead 141 has a polarity and magnitude dependent upon the difference between the compared voltages. Accordingly, the control voltage may have both positive and negative values.

Figure 5:
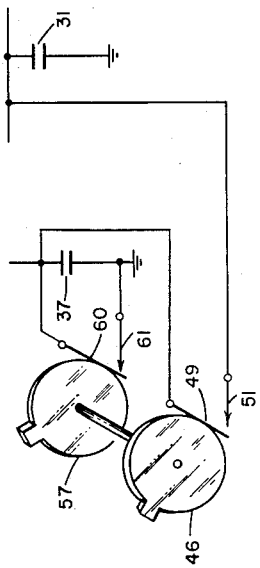
Fig. 5 is a schematic representation of a modification which may be made to the apparatus of Fig. 1.

The circuit arrangement of Fig. 1 may be modified in the manner shown in Fig. 5 whereby cathode follower 54, differential amplifier 55, multivibrators 52 and 53 and phase inverter 56 are not required. To this end, movable contact 49 of the switch associated with cam 46 is connected to the ungrounded terminal of condenser 37 and the fixed contact 51 of this switch is connected to the ungrounded terminal of condenser 31.

The circuit operates in essentially the same manner as described in connection with Fig. 1 except that, at the termination of each checking interval $t_1$, cam 46 closes the switch 49, 51 and condenser 37 is momentarily connected parallel with condenser 31. Accordingly, any charge difference between these condensers tends to equalize. That is, if the voltage on condenser 31 is higher than the voltage on condenser 37, approximately one-half of the voltage difference is subtracted from the charge voltage on condenser 31. Conversely, if the voltage on condenser 37 is higher than the voltage on condenser 31, approximately one-half the voltage difference is added to the charge voltage on condenser 31. At the termination of each reset interval $t_2$, condenser 37 is shunted by switch 60, 61 in the manner described in connection with Fig. 1.

In this way, cumulative errors in the sum derived by condenser 31 may be compensated. Although a correction of one-half the difference is effected for each checking interval, it is evident that for a constant cumulative error, essentially complete compensation may be afforded over a period of operation including many checking intervals.

In another alternative arrangement, instead of driving tape 19 and cams 42, 46 and 57 by motor 22, these elements may be driven in synchronism with the winch (not shown) which controls the movement of housing 10 through borehole 11. The spacing between recording head 18 and the pick-up head 25 is adjusted to provide a desired time delay between the occurrence of output pulses from detector 16 representing a nuclear characteristic at any particular depth and the time at which an indication of pulse rate is derived by condenser 31. Accordingly, the indicated depth of the recorded information may be effectively displaced from the actual level of housing 10. Thus, if an additional detector is spaced longitudinally from detector 15, simultaneous records may be made whereby indications representing the outputs of both detectors may be effectively adjusted to the same level in the borehole.

While particular embodiments of the present invention have been shown and described, it is apparent that changes and modifications may be made without departing from this invention in its broader aspects, and therefore the aim in the appended claims is to cover all such changes and modifications as fall within the true spirit and scope of this invention.

I claim:
1. Logging apparatus comprising: a detector adapted to be passed through a borehole for deriving output impulses representing a nuclear characteristic of earth formations traversed by the borehole; a first accumulator; means for applying an impulse to said first accumulator in a given sense in response to each of said output impulses of said detector; means for applying an impulse to said first accumulator in a sense opposite to said given sense at a time delayed from the application of each impulse of said given sense by a fixed time interval; a second accumulator; means for applying impulses to said second accumulator in response to said output impulses of said detector during repetitive checking intervals having a duration substantially equal to said fixed time interval; means operative at the termination of each of said checking intervals for adjusting the derived sum in said first accumulator in response to the derived sum in said second accumulator; and means for indicating the instantaneous value of the sum derived by said first accumulator thereby to obtain a log of the earth formations under investigation.

2. Apparatus for measuring the rate of occurrence of a succession of impulses comprising: a first accumulator; means for applying an impulse to said first accumulator in a given sense in response to each of said succession of impulses; means for applying an impulse to said first accumulator in a sense opposite to said given sense at a time delayed from the application of each impulse of said given sense by a fixed time interval; a second accumulator; means for applying an impulse to said second accumulator in response to each of said succession of impulses occurring during one of repetitive checking intervals having a duration substantially equal to said fixed time interval; means operative at the termination of each of said checking intervals for adjusting the derived sum in said first accumulator in response to the derived sum in said second accumulator; and means for indicating the instantaneous value of the sum derived by said first accumulator.

3. Apparatus for measuring the rate of occurrence of a succession of impulses comprising: a first accumulator; means for applying an impulse to said first accumulator in a given sense in response to each of said succession of impulses; means for applying an impulse to said first accumulator in a sense opposite to said given sense at a time delayed from the application of each impulse of said given sense by a fixed time interval thereby to effect a derived sum in said first accumulator representing the average rate of occurrence of said succession of impulses over an interval equal to said fixed time interval; a second accumulator; means for applying an impulse to said second accumulator in response to each of said succession of impulses occurring during one of repetitive checking intervals having a duration substantially equal to said fixed time interval; and means operative at the termination of each of said checking intervals for adjusting the derived sum in said first accumulator in response to the derived sum in said second accumulator.

4. A pulse-rate-measuring system comprising: first and second integrators; means for effecting a unit change in said first integrator in a given sense in response to each of a succession of pulses to be measured and for effecting a unit change therein in a sense opposite to said given sense and at a time delayed from each unit change of said given sense by a fixed time interval thereby to derive a sum representing the average rate of occurrence of said pulses over said fixed time interval; means for effecting a unit change in said second integrator in response to each of said pulses during one of repetitive checking intervals having a duration substantially equal to said fixed time interval; and means operative at the termination of each of said checking intervals and responsive to the derived sum in said second integrator for adjusting the derived sum in said first integrator to compensate for errors which may be cumulative.

5. A pulse-rate-measuring system comprising: first and second integrators; means for effecting a unit change in said first integrator in a given sense in response to each of a succession of pulses to be measured and for effecting a unit change therein in a sense opposite to said given sense and at a time delayed from each unit change of said given sense by a fixed time interval thereby to derive a sum representing the average rate of occurrence of said pulses over said fixed time interval; means for effecting a unit change in said second integrator in response to each of said pulses during one of repetitive checking intervals having a duration substantially equal to said fixed time interval; means operative at the termination of each of said checking intervals and responsive to the derived sum in said second integrator for adjusting the derived sum in said first integrator to compensate for errors which may be cumulative; and means operative subsequent to each adjustment in the sum in said first integrator, but prior to the initiation of the checking interval next following such an adjustment, for returning the derived sum in said second integrator to a reference value.

6. Apparatus for measuring the rate of occurrence of a succession of impulses comprising: a first condenser; a charging circuit for said first condenser for applying an incremental charge thereto in a given sense in response to each of said succession of impulses; another charging circuit for said first condenser for applying an incremental charge thereto in a sense opposite to said given sense at a time delayed from the application of each charge of said given sense by a fixed time interval; a second condenser; a charging circuit for said second condenser for applying an incremental charge thereto in response to each of said succession of impulses occurring during repetitive checking intervals having a duration substantially equal to said fixed time interval; and means operative at the termination of each of said checking intervals for adjusting the derived sum in said first condenser in response to the derived sum in said second condenser.

7. Apparatus for measuring the rate of occurrence of a succession of impulses comprising: a first condenser; a synchronized multivibrator supplied with said succession of impulses and including a conduction-controlled device connected in series circuit relation with said first condenser for applying an incremental charge thereto in a given sense in response to each of said succession of impulses; another synchronized multivibrator supplied with an impulse at a time delayed from the application of each impulse to said first-mentioned multivibrator by a fixed time interval and including a conduction-controlled device connected in series circuit relation with said first condenser for applying an incremental charge thereto in a sense opposite to said given sense; a second condenser; a charging circuit for said second condenser for applying an incremental charge thereto in response to each of said succession of impulses during repetitive checking intervals having a duration substantially equal to said fixed time interval; and means operative at the termination of each of said checking intervals for adjusting the derived sum in said first condenser in response to the derived sum in said second condenser.

8. Apparatus for measuring the rate of occurrence of a succession of impulses comprising: a first condenser; a charging circuit for said first condenser for applying an incremental charge thereto in a given sense in response to each of said succession of impulses; another charging circuit for said first condenser for applying an incremental charge thereto in a sense opposite to said given sense at a time delayed from the application of each charge of said given sense by a fixed time interval; a second condenser; a charging circuit for said second condenser for applying an incremental charge thereto in response to each of said succession of impulses during repetitive checking intervals having a duration substantially equal to said fixed time interval; means operative at the termination of each of said checking intervals for comparing the sums in said first and said second condensers to derive a control potential responsive to the relative difference between said derived sums; first and second normally inoperative multivibrators each operative in response to a respective polarity condition of said control potential for deriving a pulse at the termination of a checking interval; and means for applying pulses derived by said multivibrators to one of said charging circuits to adjust the derived sum in said first condenser.

9. Logging apparatus comprising: a detector adapted to be passed through a bore hole for deriving output impulses representing a nuclear characteristic of earth formations traversed by the borehole; means for passing said detector through the borehole; a recording medium; means for displacing said recording medium along a given path at a velocity proportional to the speed with which said detector is passed through the borehole; a recorder device disposed at a point adjacent said given path for recording said output impulses on said recording medium; an accumulator; a first pick-up device disposed at another point adjacent said given path spaced from said first-mentioned point at a distance corresponding to a desired proportionate longitudinal distance along the borehole for deriving the impulses recorded on said recording medium; means for applying the impulses derived by said first pick-up device to said accumulator in a given sense; a second pick-up device disposed at yet another point adjacent said given path spaced from said other point for deriving the impulses recorded on said recording medium; means for applying the impulses derived by said second pick-up device to said accumulator in a sense opposite to said given sense; and means for indicating the instantaneous value of the sum derived by said accumulator thereby to obtain a log of the earth formations under investigation.

10. Logging apparatus comprising: a detector adapted to be passed through a bore hole for deriving output impulses representing a nuclear characteristic of earth formations traversed by the borehole; a recording medium; means for displacing said recording medium along a given path at a predetermined velocity; a recorder device disposed at a point adjacent said given path for recording said output impulses on said recording medium; an accumulator; a first pick-up device disposed at another point adjacent said given path spaced from said first-mentioned point for deriving the impulses recorded on said recording medium; means for applying the impulses derived by said first pick-up device to said accumulator in a given sense; a second pick-up device disposed at yet another point adjacent said given path spaced from said other point at a distance such that, with said recording medium travelling at said predetermined velocity, said second pick-up device derives each of said impulses recorded on said recording medium at a selected, fixed time interval after such an impulse is derived by said first pick-up device; means for applying the impulses derived by said second pick-up device to said accumulator in a sense opposite to said given sense; and means for indicating the instantaneous value of the sum derived by said accumulator thereby to obtain a log of the earth formations under investigation.

References Cited in the file of this patent

UNITED STATES PATENTS

| | | |
|---|---|---|
| 2,436,503 | Cleveland | Feb. 24, 1948 |
| 2,584,138 | Lichtman | Feb. 5, 1952 |
| 2,659,823 | Vossberg | Nov. 17, 1953 |
| 2,685,027 | Alvarez | July 27, 1954 |